United States Patent
Patterson et al.

(10) Patent No.: US 11,212,306 B2
(45) Date of Patent: *Dec. 28, 2021

(54) GRAPH DATABASE ANALYSIS FOR NETWORK ANOMALY DETECTION SYSTEMS

(71) Applicant: Accenture Global Solutions Limited, Dublin (IE)

(72) Inventors: Joshua Patterson, Baltimore, MD (US); Michael Evan Wendt, College Park, MD (US); Keith Kraus, Arlington, VA (US); Louis William DiValentin, Fairfax, VA (US); Robin Lynn Burkett, Alexandria, VA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/724,655

(22) Filed: Dec. 23, 2019

(65) Prior Publication Data

US 2020/0145441 A1    May 7, 2020

Related U.S. Application Data

(63) Continuation of application No. 15/697,080, filed on Sep. 6, 2017, now Pat. No. 10,530,796.

(Continued)

(51) Int. Cl.
*H04L 29/06* (2006.01)
*G06F 16/27* (2019.01)
(Continued)

(52) U.S. Cl.
CPC .......... *H04L 63/1425* (2013.01); *G06F 16/27* (2019.01); *G06F 16/9024* (2019.01);
(Continued)

(58) Field of Classification Search
CPC . H04L 63/1425; H04L 63/14; H04L 63/1416; G06F 16/27; G06F 16/9024
(Continued)

(56) References Cited

U.S. PATENT DOCUMENTS 6,735,548 B1 ‡  5/2004  Huang ................... H04L 41/12
                                                    702/17
8,266,697 B2 *  9/2012  Coffman ................ H04L 63/14
                                                    726/23

(Continued)

FOREIGN PATENT DOCUMENTS

WO       2006/077666    ‡  6/2008
WO    WO 2006/077666        6/2008
(Continued)

OTHER PUBLICATIONS

JP Office Action in Japanese Appln. No. 2017-169630, dated Oct. 2, 2018, 7 pages (machine translation).‡

(Continued)

*Primary Examiner* — Dereena T Cattungal
(74) *Attorney, Agent, or Firm* — Fish & Richardson P.C.

(57) ABSTRACT

Graph database analysis for network anomaly detection systems, in which a data analysis device receives multiple log data entries including parameters associated with a computer network event in a computing network. The data analysis device extracts one or more parameters in real-time and generates a network event graph based on at least one of a first graph metric or a second graph metric. The first and second graph metrics are based on the one or more extracted parameters. The data analysis device detects, based on queries performed on the network event graph, at least one of an anomalous event associated with the computing network or a malicious event associated with the computing network.

20 Claims, 6 Drawing Sheets

Related U.S. Application Data (60) Provisional application No. 62/384,128, filed on Sep. 6, 2016.

(51) Int. Cl.
*G06F 16/901* (2019.01)
*G06K 9/00* (2006.01)
*G06F 21/55* (2013.01)
*G06K 9/62* (2006.01)

(52) U.S. Cl.
CPC ....... *G06F 21/554* (2013.01); *G06K 9/00536* (2013.01); *G06K 9/6219* (2013.01); *H04L 63/14* (2013.01); *H04L 63/1416* (2013.01); *G06F 21/552* (2013.01)

(58) Field of Classification Search
USPC .......................................................... 726/23
See application file for complete search history.

(56) References Cited

U.S. PATENT DOCUMENTS

| | | | | |
|---|---|---|---|---|
| 8,674,993 | B1 ‡ | 3/2014 | Fleming | G06Q 40/06 345/44 |
| 8,682,812 | B1 * | 3/2014 | Ranjan | H04L 63/1425 706/12 |
| 8,762,298 | B1 * | 6/2014 | Ranjan | G06F 21/552 706/12 |
| 8,881,288 | B1 * | 11/2014 | Levy | H04L 63/1408 726/25 |
| 9,231,962 | B1 * | 1/2016 | Yen | G06F 21/552 |
| 9,940,472 | B2 * | 4/2018 | Akkiraju | G06F 16/9024 |
| 9,990,367 | B2 ‡ | 6/2018 | Bowman | G06F 21/602 |
| 10,015,182 | B1 * | 7/2018 | Shintre | H04L 63/1441 |
| 10,044,745 | B1 * | 8/2018 | Jones | H04L 63/1425 |
| 10,075,464 | B2 * | 9/2018 | Kesin | H04L 63/083 |
| 10,129,282 | B2 * | 11/2018 | Jones | G06F 21/554 |
| 10,305,922 | B2 * | 5/2019 | Devi Reddy | G06F 16/904 |
| 2003/0188189 | A1 ‡ | 10/2003 | Desai | H04L 63/104 726/23 |
| 2007/0209074 | A1 * | 9/2007 | Coffman | H04L 63/145 726/23 |
| 2009/0097418 | A1 ‡ | 4/2009 | Castillo | H04L 41/12 370/25 |
| 2012/0303573 | A1 ‡ | 11/2012 | Pan | G06N 7/005 706/52 |
| 2013/0179974 | A1 * | 7/2013 | Manadhata | H04L 63/145 726/24 |
| 2013/0219503 | A1 ‡ | 8/2013 | Amnon | G06F 21/55 726/25 |
| 2014/0196110 | A1 * | 7/2014 | Rubinstein | G06F 21/57 726/3 |
| 2015/0023693 | A1 | 8/2015 | Bassett | |
| 2015/0236935 | A1 ‡ | 8/2015 | Bassett | H04L 63/1408 709/22 |
| 2016/0036707 | A1 ‡ | 2/2016 | Mestery | H04L 41/12 370/23 |
| 2016/0048681 | A1 ‡ | 2/2016 | Fang | G06F 21/56 726/23 |
| 2016/0117358 | A1 * | 4/2016 | Schmid | G06F 16/2228 707/736 |
| 2016/0342628 | A1 ‡ | 11/2016 | Van Rest | G06F 16/835 |
| 2017/0063886 | A1 * | 3/2017 | Muddu | G06K 9/2063 |
| 2017/0083386 | A1 * | 3/2017 | Wing | G06Q 10/10 |
| 2017/0126712 | A1 * | 5/2017 | Crabtree | H04L 63/1425 |
| 2018/0077175 | A1 ‡ | 3/2018 | DiValentin | G06F 21/552 |
| 2018/0181446 | A1 * | 6/2018 | Bequet | G06F 16/9024 |

FOREIGN PATENT DOCUMENTS

| | | | |
|---|---|---|---|
| WO | WO-2013/184206 | ‡ | 12/2013 |
| WO | WO 2013/184206 | | 12/2013 |

OTHER PUBLICATIONS

'conferences.oreilly.com' [online] "Streaming cybersecurity into Graph: Accelerating Data into Datastax Graph and Blazegraph," Sep. 29, 2016, [retrieved on Jul. 23, 2018] Retrieved from Internet: URL<https://conferences.oreilly.com/strata/strata-ny-2016/public/schedule/detail/52168> 7 pages.

'www.backhat.com' [online] "Blackhat USA 2016" Jul. 30-Aug. 4, 2016 [retrieved on Jul. 23, 2018] Retrieved from Internet: URL<https://www.blackhat.com/us-16/arsenal.html#accelerating-cyber-hunting-project-asgard> 45 pages.

AU First Examination Report for Australian Application No. 2017221858, dated Apr. 16, 2018, 6 pages.

AU First Examination Report for Australian Application No. 2017224993, dated Apr. 17, 2018, 3 pages.

AU Office Action in Australian Appln. No. 2017-221858, dated Sep. 5, 2018, 4 pages.

AU Office Action in Australian Appln. No. 2017-224993, dated Sep. 7, 2018, 2 pages.

EP Extended European Search Report in European Application No. 17188295.4, dated Nov. 7, 2017, 7 pages.

EP Extended European Search Report in European Application No. 17188522.1, dated Nov. 9, 2017, 7 pages.

EP Office Action in European Application No. 17188522.1, dated Mar. 23, 2020, 8 pages.

\* cited by examiner
‡ imported from a related application

GRAPH DATABASE ANALYSIS FOR NETWORK ANOMALY DETECTION SYSTEMS

CROSS-REFERENCE TO RELATED APPLICATIONS

This application is a continuation of U.S. application Ser. No. 15/697,080, filed Sep. 6, 2017, now allowed, which claims the benefit of U.S. Provisional Application No. 62/384,128, filed Sep. 6, 2016, and titled "Graph Database Analysis for Network Anomaly Detection Systems." Both of these prior applications are incorporated by reference in their entirety.

FIELD

The present specification relates to detection of malicious threats to a computer network.

BACKGROUND

Computer networks may include multiple computing assets that enable individuals or users to access shared resources including a variety of digital content accessible by the internet. A computer network can be a set of computers connected together to form one or more nodes within a personal area network, a local/virtual area network, a wide area network, or any other type of network architecture associated with a collection of computing devices. Access to the internet and to other web resources that are external to a particular network presents a variety of cyber security challenges. As such, computing assets within an example computer network may be susceptible to data breaches or attacks from malicious users seeking unauthorized access to one or more assets within the network.

SUMMARY

This specification describes a scalable, accelerated malicious threat detection system that provides complex insights for identifying current network threats. Systems and methods are described that relate to analytical processes for individual threat detection based on patterns of network activity. The described subject matter further relates to the processing of log data to generate network event graphs and to the application of graph queries to detect indicators of potential malicious activity within a network. Based on results of the graph queries, network events can be analyzed to identify and/or mitigate security threats from malicious actors or program code for obtaining unauthorized access to computer network assets. Accordingly, more effective and timely detection of cyber threats are achieved through application of the teachings described herein.

One aspect of the subject matter described in this specification can be embodied in a computer-implemented method. The method includes receiving, by a data analysis device, multiple log data entries, the log data entries including parameters associated with a computer network event in a computing network and extracting, by the data analysis device, one or more parameters, wherein the parameters are extracted in real-time. The method includes generating, by the data analysis device, a network event graph based on at least one of a first graph metric or a second graph metric, the first and second graph metrics being based on the one or more extracted parameters. The method further includes, detecting, by the data analysis device and based on queries performed on the network event graph, at least one of an anomalous event associated with the computing network or a malicious event associated with the computing network.

These and other implementations can each optionally include one or more of the following features. For example, in some implementations, detecting includes, performing one or more queries on the network event graph to detect one or more secondary nodes that have engaged in data communications with at least one primary node. In one aspect of this implementation, the at least one primary node is directly associated with at least one of the anomalous event or the malicious event. In another aspect, the method further comprises, analyzing, by the data analysis device, network communication activities of the one or more secondary nodes to identify at least one tertiary node that has a correlation to the at least one primary node.

In some implementations, the method further comprises, storing, in a first storage medium of the data analysis device, the network event graph and the first and second graph metrics. In one aspect of this implementation, the first storage medium is at least one of a graph database or a graphics processing unit (GPU) accelerated graph database. In another aspect, the method further comprises, storing, in a second storage medium of the data analysis device, the first graph metrics and the second graph metrics, wherein storing includes formatting the first and send graph metrics to be stored in the first storage medium. In another implementation, extracting includes using a data stream processing engine to apply an extract, transform, load function to extract one or more parameters in real-time.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes systems and methods for retrieval of multiple log files from a variety of network protection tools and conversion of the log data by a data analysis device. The data analysis device can include one or more modules that apply graph and time-series analytical measures to retrieved data to enable detection of malicious threats to a computer network. Application of the graph analysis and time-series analysis measures enable visualization of retrieved log data as a graphical network having one or more nodes and edges.

In some implementations, graph analysis measures include: 1) collection and storage, at periodic time intervals, of network event data captured by log files; 2) application of graph analytic measures to network event data in response to collection and storage of network event data; and 3) updating graph analytics calculations at a predetermined rate for each time interval in which collection and storage occurs.

Prior to time-series analysis, data enrichment, by the analysis device, occurs when certain parameters associated with network event data are parsed or extracted. Time-series analysis measures are applied to the extracted parameters to compare the parameter values to a baseline or threshold value. This comparison can indicate sudden or abrupt shifts in network activity of a particular node. Malicious threat identification or detection is then enabled based on particular sudden and unexpected shifts in network activity. In some implementations, detection of an anomalous or abnormal computer network event provides indication of a malicious threat.

This specification further describes systems and methods for generating network event graphs that can be queried against large volumes of log data provided by distinct network security devices. The log data can be received by a distribution device and processed in real-time. An extraction function can be applied to extract relevant parameters and features from the processed log data. The extracted data can be used to generate network event graphs.

Data relating to network event graphs can be saved in one or more graph databases that are configured to receive queries for identifying certain network events. In some implementations, complex queries can be submitted to at least one graph database to rapidly detect a current cyber-security threat that may affect a particular node of a computer network. Further, query results can identify one or more secondary nodes that may be compromised based, in part, on having a data connection to a particular primary node.

Figure 1:
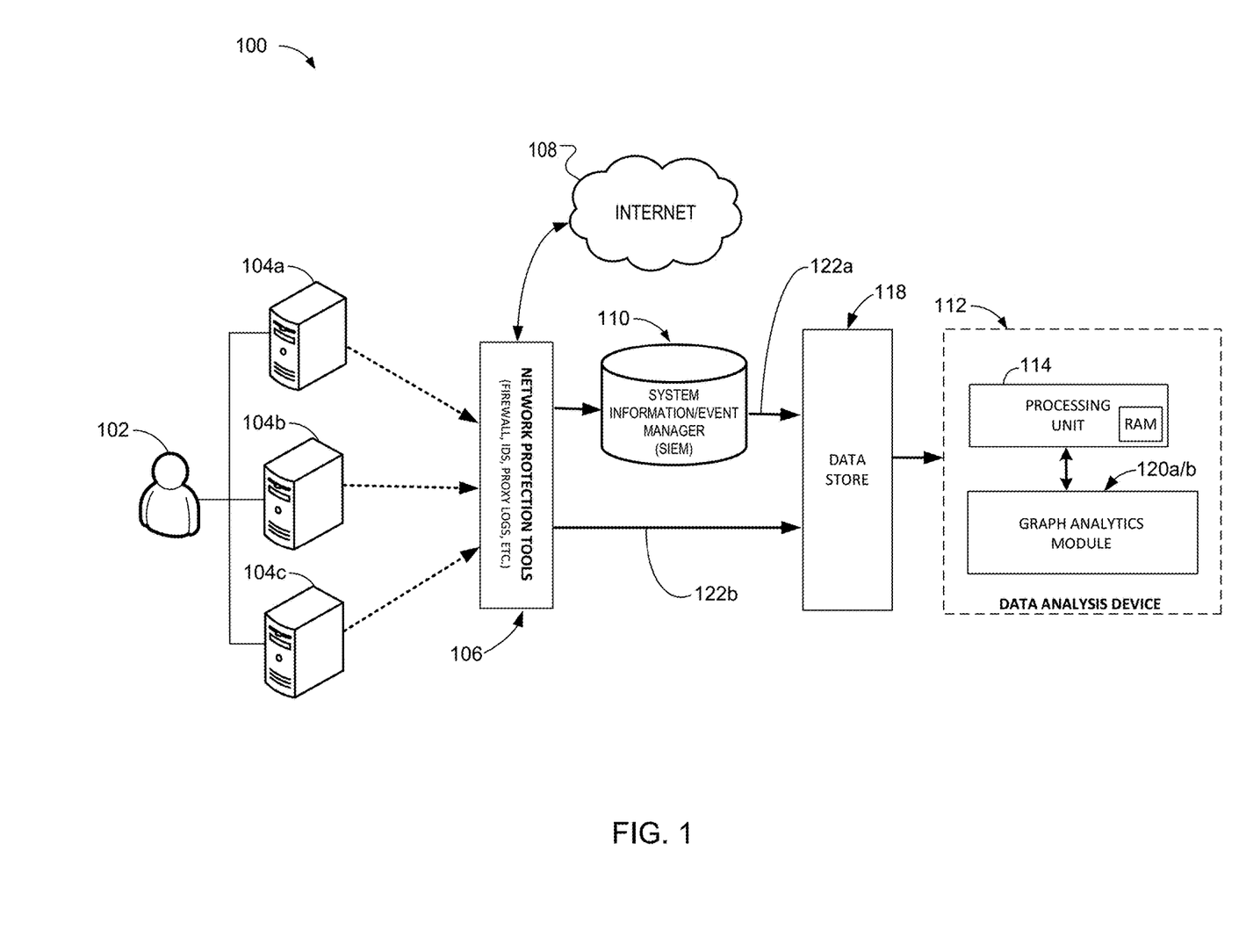
FIG. 1 illustrates a block diagram of an example computing network that includes an example data analysis device.

FIG. 1 illustrates a block diagram of an example computing network 100 that includes an example data analysis device. Network 100 includes computing assets 104*a/b/c*, network protection tools 106, security information event management device 110 (SIEM 110), and data analysis device 112 ("device 112"). A user 102 interacts with computing assets 104*a/b/c*. Although a single user 102 is shown network 100 can include multiple users 102.

In some implementations, computing assets 104*a/b/c* allow users 102 to engage in various computer related activities that generate data communications traffic within, and outside of, network 100. Computer related activities may include, for example, accessing intranet sites, drafting and sending email correspondences, printing documents, accessing resources via internet 108, and accessing shared local and external resources, such as file servers and cloud based applications.

Computing assets 104*a/b/c* can include laptop or desktop computers, print servers and printer/copier devices, email servers, application servers, routers, switches, intranet and related file servers, or other computing devices or assets that are typically associated with a computer network. For example, computing asset 104*a* can be a laptop/desktop computer, asset 104*b* can be an email server, and asset 104*c* can be a router. Although three computing assets 104 are shown in FIG. 1, network 100 can include more or fewer assets 104.

As shown, computing assets 104*a/b/c* are in data communication with network protection tools 106. Protection tools 106 provide network 100 with various network security functions. Example network security functions include blocking or filtering of data packets or other data traffic from entering and/or exiting network 100. Example network protection tools 106 can include firewalls, proxy servers, intrusion detection systems, intrusion prevention systems, packet sniffing devices, vulnerability scanning devices, or other network security devices that may be associated with a computer network.

As discussed in more detail below, respective tools or devices that collectively form network protection tools 106 can each be designed or configured to periodically generate log data/files. The generated log data can include certain parameters or attributes associated with security and non-security related events and activities that occur within network 100. As shown, each log file generated by the respective devices of network protection tools 106 can be provided to device 112 through communication data path 122*b*.

As shown, the respective devices of network protection tools 106 are each in data communication with one of STEM 110 or device 112. As it relates to computer network operations, SIEM 110 enables collection and storage of system event data and system information data relating to computing assets 104*a/b/c*, network protection tools 106, and other computing devices that may be present within computer networks (i.e., network 100).

For example, SIEM 110 can generate, track, or monitor log data related to events or information about computing activities that occur within network 100 (e.g., Domain Name System (DNS) traffic). Much like the devices of network protection tools 106, STEM 110 can also be designed or configured to periodically generate log data/files that include certain parameters and attributes for events or activities within network 100.

In some implementations, STEM 110 receives respective log files from each device of protection tools 106 and provides each log file to device 112 through communication data path 122*a*. In other implementations, SIEM 110 receives log files from each device of protection tools 106, aggregates each log file into a larger log file, and correlates each log file based on common attributes associated with the files. As shown in FIG. 1, log data from SIEM 110 is provided to data store 118 and eventually to device 112 through communication data path 122*a*.

As shown in FIG. 1, device 112 can be connected or coupled to one of SIEM 110 or network protection tools 106 through an example data store 118. In some implementations, device 112 is connected or coupled to SIEM 110 through data communications path 122*a*. In other implementations, device 112 can be connected or coupled to network protection tools 106 through data communications path 122*b* or indirectly through SIEM 110 and data communications path 122*a*. In yet another implementation, device 112 can be simultaneously coupled to both SIEM 110 through data communications path 122*a* and network protection tools 106 through either data communications path 122*b* or indirectly through SIEM 110 and data communications path 122*a*.

Device 112 includes processing unit 114 and module 120*a*. As described in more detail below with reference to FIG. 4, in alternative implementations, device 112 can include a module 120*b* that includes certain instructional logic or program code for applying, to log data in data store 118, data stream analytic measures and extraction functions to produce one or more network event graphs.

In some embodiments, processing unit 114 can include one or more processors (e.g., microprocessors or central processing units (CPUs)), graphics processing units (GPUs), application specific integrated circuits (ASICs), or a combination of different processors. In alternative embodiments, device 112 can include other computing resources/devices (e.g., cloud-based servers) that provide additional processing options for performing one or more of the determinations and calculations described in this specification.

Processing unit 114 is can include one or more memory units or memory banks. In some implementations, processing unit 114 executes programmed instructions stored in memory to cause module 120*a* and device 112 to perform one or more functions described in this specification. The memory of processing unit 114 can include one or more non-transitory machine-readable storage mediums. The non-transitory machine-readable storage medium can include solid-state memory, magnetic disk, and optical disk, a portable computer diskette, a random access memory (RAM), a read-only memory (ROM), an erasable programmable read-only memory (e.g., EPROM, EEPROM, or Flash memory), or any other tangible medium capable of storing information.

As noted above, network protection tools 106 and STEM 110 each periodically generate log data/files that can include certain parameters or attributes associated with security and non-security related events or activities (e.g., data communications, packet information, and/or data flow/traffic patterns) that occur within network 100. Accordingly, log data store 118 includes log files generated by network protection tools 106 and SIEM 110.

Module 120*a* can include certain computing logic or program code for applying, to log data in data store 118, graph analytics measures and time-series analysis measures. As described in more detail below with reference to FIG. 2, module 120*a* of device 112 can be configured to structure log data in a graphical format, and to apply graph analytic measures to the structured log data to enrich nodes based on centrality and importance measures.

Module 120*a* can be further configured to apply time-series based analytic measures to graphical data to detect sudden and unexpected shifts or changes in an indicated importance of a particular node within network 100. Although shown in FIG. 1 as being a part of device 112, in alternative embodiments, module 120*a* can be a stand-alone data analysis device that executes graphical analysis and/or time-series analysis measures independent of processing unit 114.

Figure 2:
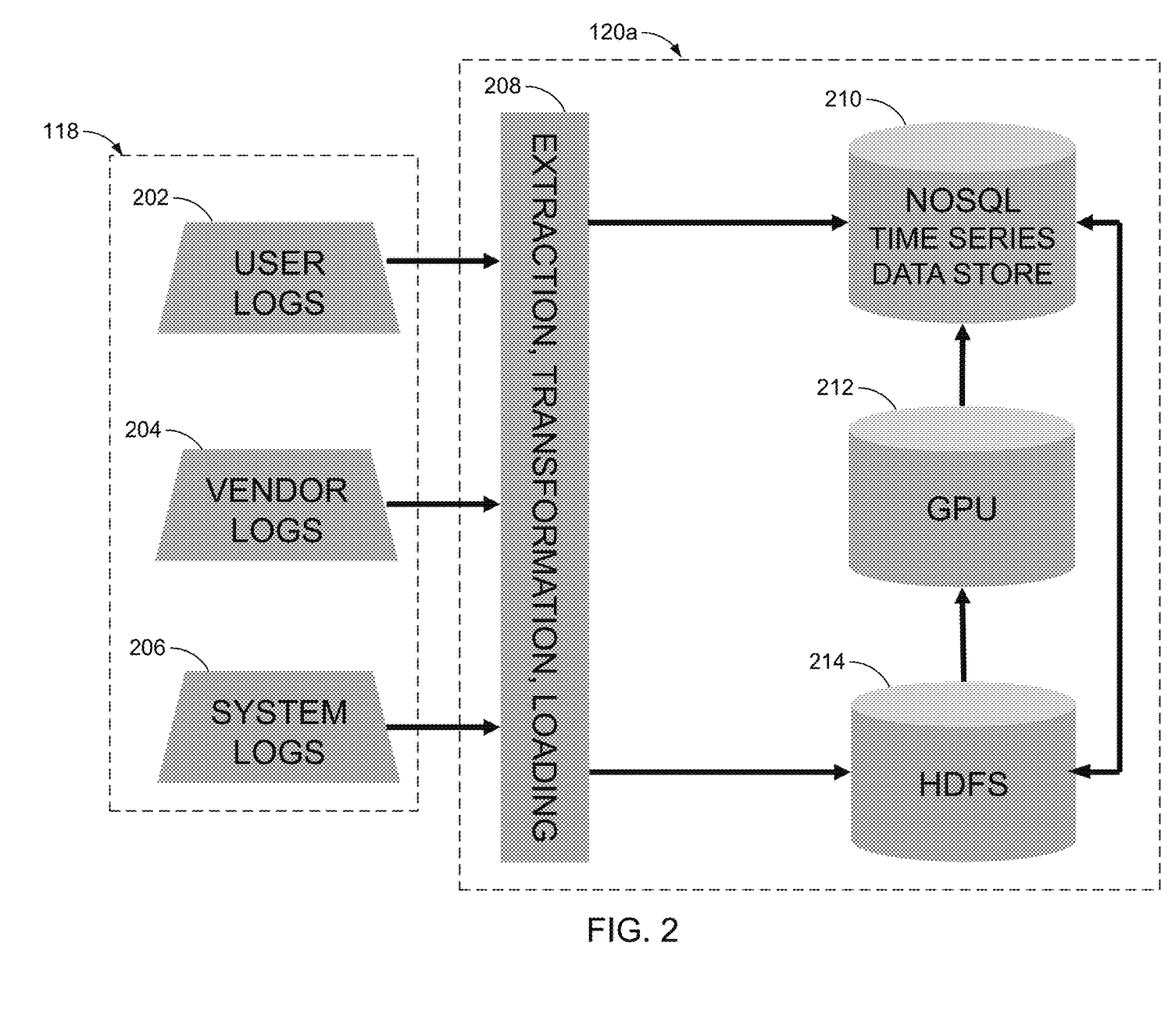
FIG. 2 illustrates a block diagram that depicts examples of graph and time-series analysis features associated with the data analysis device of FIG. 1.

FIG. 2 illustrates a block diagram that includes graph analysis and time-series analysis features associated with device 112 described above. Log data store 118 can include one or more log data types and module 120*a* can include one or more sub-modules. As shown, log data store 118 includes log data types, such as user logs 202, vendor logs 204, and system logs 206. Further, module 120*a* can include an extraction, transformation, and loading (ETL) 208 sub-module, a data store sub-module 210, a graphics processing unit 212, and an hadoop distributed file system (HDFS) 214.

User logs 202 can correspond to user specific activity or events that occur within network 100. Example user events include authentications by user 102 to network 100 and/or computing assets 104*a/b/c*, log-in attempts by user 102 to network 100 and/or computing assets 104*a/b/c*, files accessed by user 102, email correspondences sent and received by user 102, or any other related user activity that typically occurs in a computer network. Vendor logs 204 and system logs 206 can be device specific log data (e.g., based on pre-configured vendor settings) generated by STEM 110 and/or by the one or more devices of network protection tools 106.

ETL 208 receives the different types of log data from data store 118 and performs an extract function, a transform function, or a load function on the received log data, or various combinations of some or all of these functions. In some implementations, the extract function of ETL 208 analyzes the multiple log entries in log data store 118 and extracts a desired subset of log entries. The transform function of ETL 208 applies computing rules, using lookup tables or other related transform methods, to convert or transform the extracted subset of log entries to a desired state. The load function of ETL 208 is used to write the resulting data to a target database, such as a HDFS 214 or data store 210.

As described below, log data generated by devices of network 100 can be visualized as a graph network or model, with nodes representing, for example, computing assets 104*a/b/c* or users 102, and edges representing, for example, specific log entries that include parameters about network activity of certain nodes. In some implementations, the parameters include the source internet protocol (IP) address of a computing asset 104 (or an asset external to network 100) sending data and a destination IP address of a computing asset 104 (or an asset external to network 100) receiving the data. The edges of the graph model can be weighted quantities of the number of log entries that include a particular source IP address and destination IP address.

GPU 212 produces a graphical model of network 100 based, at least in part, on the extracted log entries stored in HDFS 214. The extracted log entries include at least one parameter of interest that can serve as an indicator of potentially malicious activity occurring within network 100. A parameter that indicates certain activities or events occurring within network 100 (e.g., a parameter of interest) can be identified either automatically by module 120*a* or manually by an administrator or security officer that oversees management of network 100.

In some implementations, the activity/event used to select a parameter can include indications that: i) a particular source IP address is attempting to make an outbound connection to a particular destination IP address; ii) a particular source IP address is attempting to make a number of outbound connections that exceeds a threshold number typically attempted by that source IP address based on known network activity trends; iii) a first source IP address or computing asset 104 being connected or coupled to a second source IP address or computing asset 104 that is known to be infected with malicious program code such as a virus or malware; iv) a particular user 102 is attempting to access or authenticate to a certain file or sub-network of network 100; or v) other activity associated with network 100 that can be perceived as abnormal or as an indicator of suspected cyber security vulnerabilities involving user 102, computing asset 104, or a source/destination IP address.

In some implementations, producing a graphical model of network 100 includes performing, by module 120a, a periodic log data update that includes point-in-time partitioning (PTP). In performing PTP, for each new update of extracted log entries (corresponding to a past time window) provided to HDFS 214, the past time window of data is collected/received by HDFS 214 and a new set of graph analytics metrics are calculated, by GPU 212, and stored in data store 210.

In some implementations, the graphical model produced by GPU 212 and/or the analytic metric sets are stored in data store 210 as at least one of an adjacency matrix and a compressed sparse matrix. The update rate corresponding to how often graph analytic calculations are performed for each time window can vary depending on administrator preference. Each graph analytic calculation can produce a set of graph analytic metrics that are associated with a particular node/parameter (e.g., user ID for user 102, source IP address, destination IP address, source user ID, or destination user ID) for network 100.

In some implementations, module 120a can be configured to have an hourly update rate such that GPU 212 calculates a new, or subsequent, set of graph analytic metrics every hour. Update rates may vary and can be hourly, daily, weekly or any other rate desired by an administer of network 100. The past time window corresponds to the size (e.g., in time—one day, two days, five days, etc.) of the time window that is used for the graph analytic calculations. In some implementations, module 120a is be configured to have a past time window of two days, whereby extracted log entries provided to GPU 212 correspond to network activity logs that have occurred in the past two days. Much like the update rate, the past time window can also vary depending on administrator preference.

Module 120a can include enrichment functions that associated with graph analytic measures performed by GPU 212. In some implementations, enrichment functions are applied to extracted log entries to parse, for each log entry, a time attribute associated with a particular network activity (e.g., sending or receiving data traffic/packets) of at least one in network 100. Moreover, corresponding graph analytic measures at the parsed point in time can be enriched for a source node/IP address and a destination node/IP address associated with the network activity. As discussed above, enrichment of a time attribute can include parsing a time attribute (11 am EST) for a past time window of log entries (past two days of log entries) and analyzing the contents of the log entries for a particular node or parameter over the past time window.

Graph analysis/analytic measures can include at least one of a PageRank measure, a between-ness centrality measure, a triangle count measure, or one or more other graph analytic measures configured to analyze a reoccurring characteristic of a node or parameter included in the log entries. In some implementations, analytic measures may further include use of a Katz centrality measure for determination of a node's centrality within network 100 and a Chei-Rank measure for ranking nodes within network 100 using data associated with incoming and outgoing links.

With regard to computer network analysis, graph analytic measures can be used to detect indicators of centrality that identify the most important vertices (e.g., node activity/event) within a graph. Applications can include identifying the most active nodes in a computer network. For example, in network 100, graph analytic measures can be used to identity or detect users 102 or computing assets 104 (source/destination IP) that have engaged in network activity that exceeds a threshold level of activity (e.g., attempts to access certain files/resource above a threshold, sending/receiving data packets above a threshold, etc.).

Data store 210 is a time-series data store that includes search query functionality. In some implementations, data store 210 can be a non-structured query language (NoSQL) database that provides a mechanism for storage and retrieval of time-series data. Data store 210 is configured to receive and store time-series data associated with certain nodes of network 100. As shown in FIG. 2, data store 210 can store time-series data received from GPU 212. In some implementations, the data is produced based on time-series processing performed by GPU 212 on the one or more graph metric sets generated by GPU 212. Example time series analysis methods used by GPU 212 to produce time-series data can include, for example, a time-series regression method, an auto-regressive method, a control-chart based method, a markov jump method, or any other time-series analysis method that can be implemented, at least in part, by GPU 212.

There are multiple processing methods for generating time-series data. For example, one method involves use of a conventional time-series compute function that can be implemented using HDFS 214. As shown, after generating time-series data, HDFS 214 can then provide the generated data to NOSQL data store 210 for storage and follow-on analysis. Another method for generating time-series data includes leveraging compute functions inherent to GPU 212 by, for example, providing extracted log data to a GPU cluster, performing calculations/computations to generate the time series data, and then storing the generated data in NOSQL data store 210.

In alternative implementations, time-series data can be generated based, at least in part, on computations performed on log data by ETL 208. Thus, data store 210 can receive log entries including parameters associated with a computer network event that are generated after application of the one or more functions of ETL 208. Application of time-series analysis methods is distinct from the process of generating time-series analysis data. Hence, the time series analysis methods described above can be applied to the time-series analysis data stored in data store 210 to ultimately identify malicious threats to network 100.

Modules 120 of device 112 can include program code for executing a pre-conversion process. The pre-conversion process can occur at HDFS 214 after application of data processing functions performed by ETL 208. In some implementations, the pre-conversion process is executed to pre-convert log entries into data that provides specific insight into the network activity of nodes and for storage in HDFS 214. As described above, module 120a can have a past time window of two days, whereby extracted log entries provided to GPU 212 correspond to network activity logs that have occurred in the past two days. The past time window of data is received and stored by HDFS 214. In this context, HDFS 214 can use the pre-conversion process to breakdown a past time window of data into predefined time chunks. For example, the pre-conversion process can be used to breakdown log data into specific node data and store the specific node date in 5-minute, 15-minute, or 30-minute chunks, before providing the node data to GPU 212.

In some implementations, time-series analysis enables the use of a given time period to impose a chronological order on extracted log data entries or graph metrics associated with certain nodes of network 100. A time-series graph can include a graphical data set that orders and displays attribute values, including a change in the values of an attribute or variable as time progresses. Statistical studies can be performed on time-series data and the studies can involve comparing values to a baseline or threshold value. In some examples, a time-series graph can be constructed based on analysis of at least two log data parameters, in which a time/date value is at least one parameter of the two log data parameters. Date/time increments can be plotted and values associated with the other parameter or variable can be plotted relative to the date/time increments.

Accordingly, a certain parameter value corresponds to a certain date/time in a series and parameter values can be analyzed over a specified time range to detect sudden or unexpected shifts in values relative to a baseline or threshold value. Sudden or unexpected shifts in values can correspond to a rise in a relative importance of a particular node of network 100. For example, some nodes may demonstrate elevated importance factors that are uncharacteristic and, thus, appear abnormal with respect to a known event profile of that node. Nodes demonstrating abnormal behavior or that have engaged in uncharacteristic network activity can be an indicator that the node is compromised or infected with malicious program code, such as a computer virus or malware.

In some implementations, device 112 can include computing logic for executing false positive handling (FPH) functions, where the computing logic is configured to reduce the number of false positive indications generated when certain nodes show an unusually high importance factor. FPH functions of device 112 can include enabling a whitelisting function that is applied to certain nodes that appear to have demonstrated uncharacteristically high importance factors. Such nodes can be identified as "known good nodes" that periodically generate sudden shifts in relative importance based on, for example, assigned jobs executed during a certain time period.

Example "known good nodes" can include a network vulnerability scanner, an email server, a web resource server, or any other computing asset 104 or user 102 (or other device) known to demonstrate an elevated importance factor due to a particular circumstance. Accordingly, FPH functions can be used to white-list certain "known good nodes" in order to reduce network administrator workload by decreasing the number of network security incidents that require response the administrators.

Figure 3:
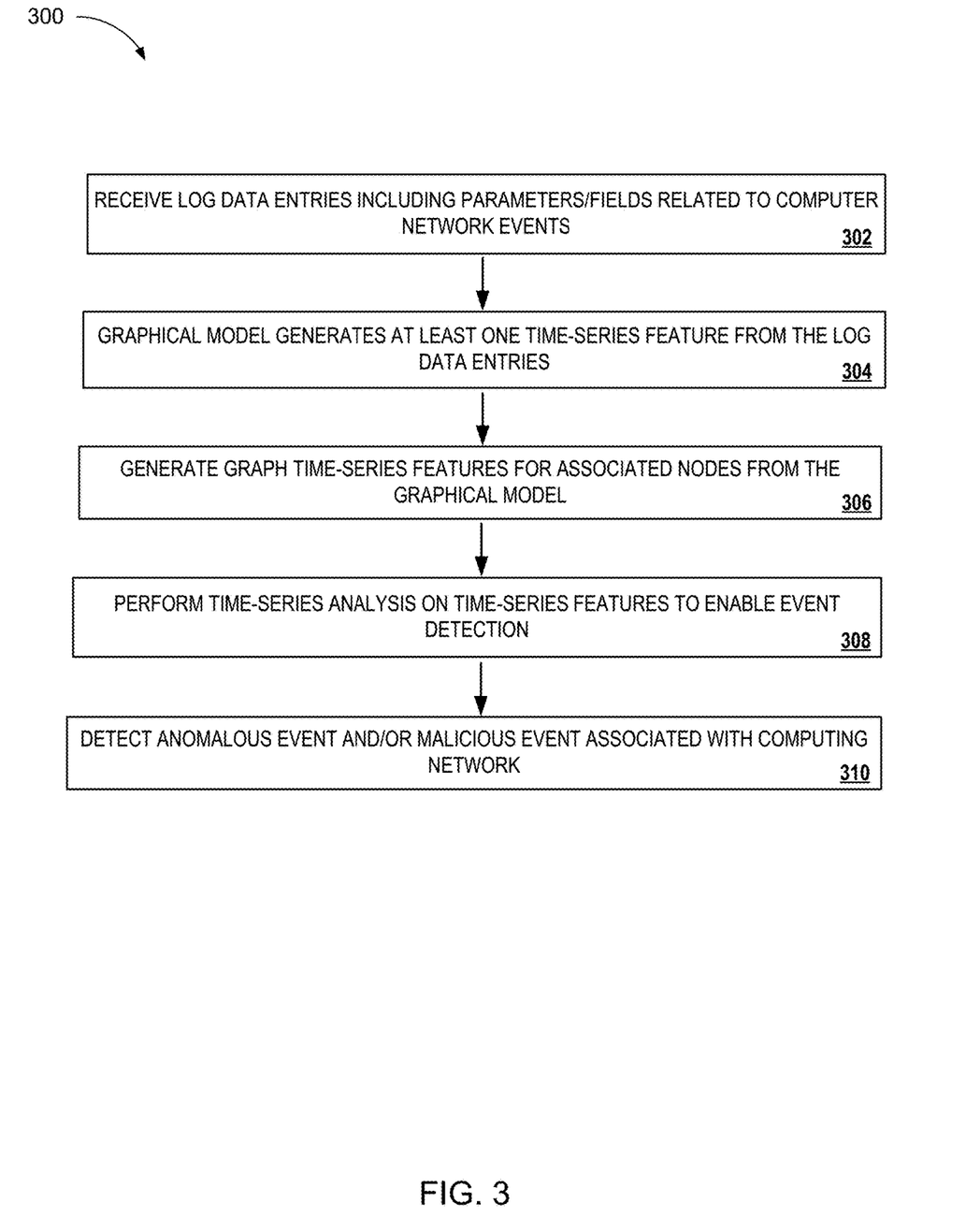
FIG. 3 illustrates a flowchart of an example process for malicious threat detection in the example computing network of FIG. 1.

FIG. 3 illustrates a flowchart of an example process 300 for malicious threat detection based on one or more graph analytic metrics and time-series performed on at least a subset of log data retrieved from devices associated with network 100. Process 300 begins at block 302 and includes, receiving, by device 112, log data from data store 118 including fields associated with network 100. As discussed above, fields can include, for example, nodes and time attributes.

Nodes can include, for example, one of a first computing asset or source IP, a second computing asset or a destination IP, a source user, or a destination user. In some implementations, fields may correspond to computing assets, users, or IP addresses that are external to network 100. At block 304, process 300 includes module 120a of device 112 building/producing a graphical model associated with network 100 based, in part, on at least one field extracted from log entries included in log data store 118.

At block 306, process 300 includes module 120a of device 112 generating graph time-series features for the graphical model, the features being also associated with a node of a network 100. As discussed above, in some implementations, the features can be importance measures determined from graph analytic models. While in other implementations, the features can be a number of times that a node engages in network activity within network 102 or a computing asset that is external to network 100.

At block 308, process 300 includes module 120a performing time-series analysis on the identified time-series features. In some implementations, the features are analyzed based on prior behavior (e.g., a baseline activity profile or trend data) or an importance factor indicated by the graph analytic features generated by GPU 212.

At block 310, process 300 determines or detects, based on the time-series models created on the identified parameters, at least one of an anomalous event associated with network 100 or a malicious event/threat associated with network 100. In some implementations, time-series analysis of the identified features enables detection of sudden and unexpected shifts that have occurred in a relative importance factor of a particular node or an identified feature (and the feature's value) of a node.

In the context of network security, a malicious event or threat can be described as the occurrence of, or potential for, a nefarious user and/or computer program (e.g., malware, virus, spyware, or botnet) gaining unauthorized access to network 100 for the purpose of causing harmful or undesired effects. Such harmful or undesired effects can include corrupting, destroying, denying access to, spying, or stealing sensitive information or data usually without a network owner's knowledge or permission.

Figure 4:
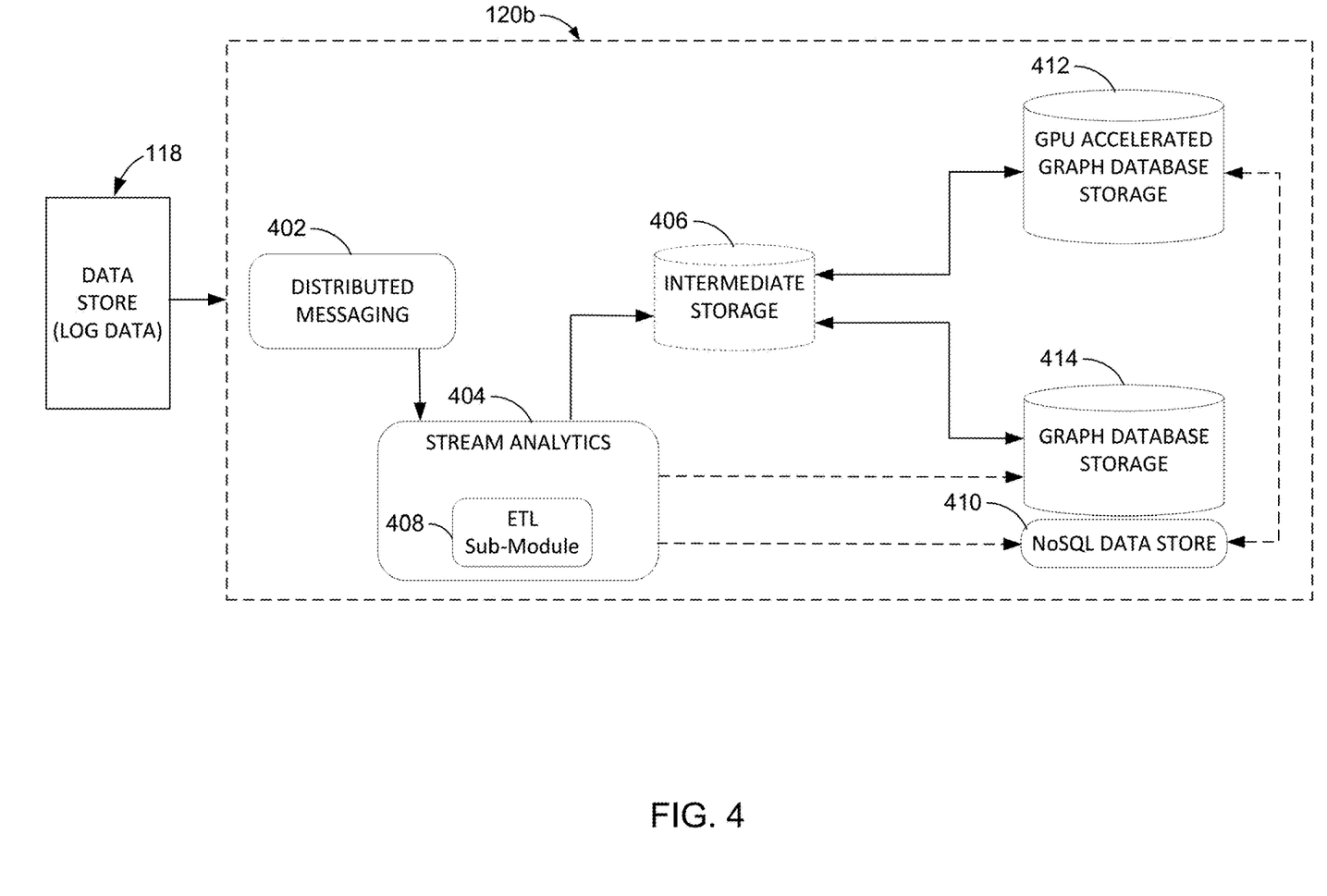
FIG. 4 illustrates a block diagram that includes examples of graph analysis features associated with the data analysis device of FIG. 1.

FIG. 4 illustrates a block diagram that includes examples of one or more graph processing and analysis features associated with the data analysis device of FIG. 1. As shown at FIG. 4, module 120b includes a messaging device 402, a stream analytics (SA) device 404, an intermediate data storage 406, a data store 410, a first graph database (GDB) 412, and a second GDB 414. SA device 404 can include an ETL sub-module 408 that functions in a manner similar to ETL sub-module 208 described above with reference to FIG. 2.

In some implementations, module 120b operates within data analysis device 112 independent of module 120a. For example, device 112 can include module 120b instead of module 120a, while in another implementation, device 112 can include both module 120a and module 120b. When device 112 includes both module 120a and module 120b, data store 118 can provide a first portion of log data to module 120a and provide a second portion of log data to module 120b. In alternative implementations, time-series analysis data produced by module 120a can be provided to module 120b for additional processing based on methods described below.

Module 120a can include certain computing logic or program code for applying data processing measures and graph analytic measures to log data in data store 118. Module 120b of device 112 can be configured to structure log data in a graphical format to produce various network event graphs. Module 120b can be further configured to store the graphical data in at least data store 410, GDB 412 or GDB 414. A user may then submit a variety of queries to the graph databases of module 120b to detect, based on the query results, malicious threats or malicious program code associated with a node(s) within network 100. Although shown in FIG. 1 as being a part of device 112, in alternative embodiments, module 120b can be a stand-alone data analysis device that executes graphical analysis and/or log data processing to generate network event graphs independent of processing unit 114.

Regarding flow of log data within module 120b, SA device 404 receives different types of log data from data store 118 and uses ETL 408 to perform an extract function, a transform function, a load function on the received log data, or to perform combinations of some or all of these functions on the log data. In some implementations, the extract function of ETL 408 analyzes the multiple log entries in log data store 118 and extracts a desired subset of log entries. Next, the transform function of ETL 408 applies rules, using lookup tables or other related transform methods, to convert or transform the extracted subset of log entries to a desired state. Finally, the load function of ETL 408 is used to write the resulting data to a target database or storage medium.

Module 120b can be used to provide complex network event processing. For example, as new log data indicating network events is received by module 120b, the log data can be rapidly processed by stream analytics (SA) engine 404 of module 120b and provided to other components of module 120b for additional analysis. In some implementations, SA engine 404 uses ETL module 408 to apply one or more ETL functions to process and format the received log data. As depicted at FIG. 4, SA device 404 can provide extracted or modified log data entries to storage 406, data store 410, first GDB 412, second GDB 414, or combinations of each.

The stored data can be queried to determine or detect whether malicious network activity is occurring within network 100. In some implementations, module 120b can be used, in conjunction with module 120a, to provide a complimentary scoring engine that utilizes graph analytics and/or time-series data produced by module 120a. For example, module 120b can assign respective risk scores to certain network activities indicated by data produced by module 120a. The risk scores can be generated based on detection of malicious network events and based on the probability that a particular malicious event has affected other computing nodes within network 100.

In some implementations, new log data entries from data store 118 are analyzed by module 120a/b in real-time to determine if a particular node has communicated with another node that was previously infected with malicious program code (e.g., malware, botnet, trojan, or other types of malicious program code). Temporal parameters can be applied to extracted log entries to determine, for example, whether communication between nodes occurred within the last 10 minutes, the last hour, the last day or the last week. Additionally, larger time periods can be analyzed as well, such as communications that have occurred over a time-span of months or years.

Some real-time network event analysis methods can require the use of multiple structure query language (SQL) "joins" (e.g., a computer function) which may require large amounts of time and computational resources to accomplish. A SQL join clause can be used to combine columns from one or more tables in a relational database. The join computer function can create a data set that can be saved as a table or used as-is. In some instances, a JOIN is a means for combining columns from one (self-table) or multiple tables by using values common to each. Current methods for processing SQL joins in sub-second time typically require a system throughput of 100,000 events per minute which can be problematic when cyber security analyst attempt to perform complex queries on large volumes of extracted log data.

Utilizing the systems and methods described in this specification, graph databases that include network event graph structures can be used to rapidly process complex queries for cyber security event detection. Graph database (GDB) storage 412 and 414 of module 120b enable processing of queries to determine, for example, if a certain first/primary node (that is infected with malicious code) has engaged in data communications (e.g., exchanged data packets) with a certain second node and whether that the second node has engaged in data communications with a certain third node. Hence, degrees of separation can be identified between two or more nodes and risk scores can be assigned based on a certain node having a direct or indirect connection to a primary node that has been infected with malicious code.

Referring again to flow of log data within module 120b; log data can include cyber security events indicating that, for example, a first IP address provided data packets to, or engaged in data communications with, a second IP address. The log data including the cyber security event is provided to messaging device 402. In some implementations, messaging device 402 can be a messaging queue configured to ensure log data including cyber security events are retrieved from data store 118 and provided to, or received by, SA device 404. Thus, messaging device 402 can include a line, sequence, or batch of messages (e.g., log data entries) that require processing by SA device 404.

SA device 404 can be an example data stream processing engine configured to apply one or more ETL functions. In some implementations, message streams are processed in real-time by SA device 404 by extracting relevant or desired information or features, and providing the extracted features to storage 406, data store 410, GDB 414, or combinations of each. As described in more detail below, extracted features are used by GDB 412 or GDB 414 to produce network event graphs that can be queried. Features that can be extracted include, for example, known nodes infected with malicious code, host names of computing assets, Uniform Resource Locators (URL), IP addresses, Usernames, or any other information associated with a node of computing network 100.

Once the graph structure or network event graph is generated, queries can be submitted to the graph databases in module 120b that store the network event graphs (e.g., GDB 412, 414). In some implementations, the queries can be submitted via, for example, a query terminal coupled to computing device that is in data communication with module 120b. For example, queries can be used to determine which IP addresses have exchanged data communications with a particular primary IP address (e.g., primary node/node 0). In response to receiving this query, the graph database can provide results that include a first set of IP addresses (e.g., secondary nodes/node(s) 1). As used herein, the IP addresses refer to identifiers for hardware computing assets that are configured for exchanging data communications.

Follow on queries can then be submitted to determine which IP addresses the first set of IP addresses exchanged data communications with and the graph database can provide results that include a second set of IP addresses (e.g., tertiary nodes/node(s) 2). The second set of IP addresses can have a first order or direct connection to the first set of IP addresses and a second order or indirect connection to an IP address described as the primary node.

As described in more detail below with reference to FIG. 6, query results can be depicted as a tree or node structure and additional queries can be submitted to expand the tree based on detected connections to a primary node. In the example discussed above, a primary node can be a node that has recently been infected with malicious code. Hence, the queries are submitted to module 120b to determine which other nodes may potentially be infected with malicious code or may otherwise be vulnerable/susceptible to a cybersecurity attack. Module 120b and data analysis device 112 therefore provide flexibility to probe and analyze large amounts of log data entries through submission of complex queries that cannot presently be submitted to, or processed by, conventional network databases.

In some implementations, module 120b can include intermediate storage 406, while in other implementations, module 120b does not include storage 406. Storage 406 can be an example storage medium for storing extracted log data storage and may be used as an intermediary storage device between the stream processing engine (SA device 404) and the databases that are used as storage for network event graphs. In some implementations, storage 406 is used when direct streaming into GDB 414 is not enabled within module 120b. For example, due to data or file formatting conflicts between SA device 404 and GDB 414, intermediate storage 406 can be used to process received data for conversion to a format that is accepted by GDB 414.

Network event graphs are stored in GDB 412 and/or GDB 414 in a graph format. These graph databases 412/414 can be queried in the form of a graph to determine communication patterns between various nodes of network 100. In some implementations, queries are submitted directly to GDB 412, 414, however, as noted above, a user can query the databases through a separate terminal that couples to data analysis device 112. In various implementations, results or answers that are responsive to a query are provided by the graph database 412, 414 that receives the submitted query/question.

In some implementations, GDB 412 is a GPU accelerated graph database and is a distinct database relative to GDB 414. GPU accelerated GDB 412 can be used, or configured, to perform accelerated graphical analysis relative to the GDB 414. For example, GDB 412 can utilize faster graphical processing functions to produce network event graphs that have a smaller sample size of node/network event data when compared to a sample size of event data used by GDB 414.

As discussed above with reference to FIG. 2, log data generated by devices of network 100 can be visualized as a graph network that includes various cyber security events associated with computing nodes in network 100. Nodes can represent, for example, computing assets 104a/b/c or users 102, and edges can represent, for example, specific log entries including parameters or features associated with network activity of certain nodes. In some implementations, the features include, for example, the source internet protocol (IP) address of a computing asset 104 (or an asset external to network 100) that sends data and a destination IP address of a computing asset 104 (or an asset external to network 100) that receives the data. The edges of the graph model can be weighted quantities of the number of log entries that include a particular source IP address and destination IP address.

In some implementations, in addition to IP addresses, assets and/or nodes within network 100 can be identified using unique identifiers. For example, in contrast to IP addresses that sometimes change when dynamically assigned to nodes and assets, unique identifiers can be static descriptors for identifying respective nodes or groups of nodes within network 100. These unique identifiers can be used to accurately identify assets and nodes that are associated with network event indicated by respective log files, or respective entries within a log file. Hence, unique identifiers can be used to provide more detailed insight for identifying particular assets or nodes that are involved in (or affected by) suspected malicious network activity.

In some implementations, an asset can be a computer/computing device, a source, a destination, a user account, a media access control (MAC) address of a network interface controller/card, a domain, or a host and a node can be defined as including two or more assets. In some instances, the unique identifiers can be used to define correlations or overlapping relationships that exist between at least two respective assets. For example, based on network correlations between a user account and a MAC address, a unique identifier (e.g., an alpha-numeric identifier) can be used to indicate that a particular user account and a particular MAC address should be treated as a single node.

In some implementations, unique identifiers can be used to perform domain collapsing such that nodes can be defined as including a range of IP addresses based on the IP addresses assignment to a particular subnet within network 100. For example, a subnet may be defined as supporting a particular range of IP addresses, and at least a subset of the IP addresses in the range can be grouped by a single unique identifier that defines a node within network 100.

Figure 5:
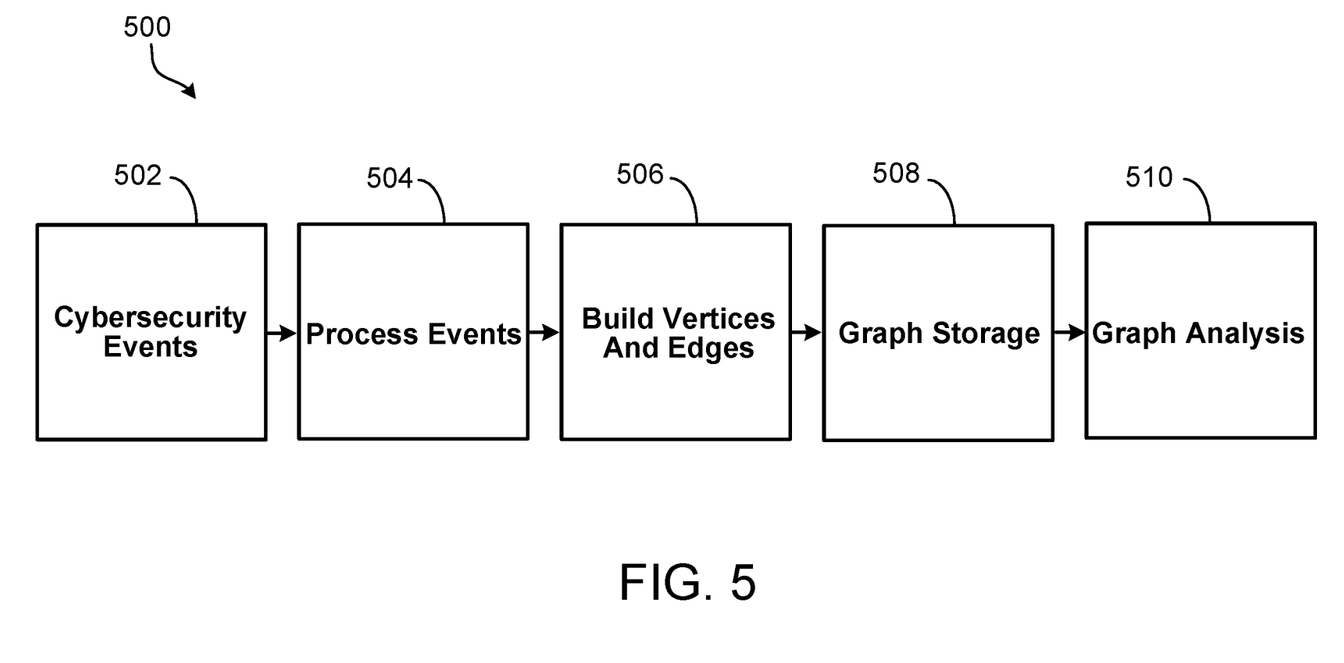
FIG. 5 illustrates a flowchart of another example process for malicious threat detection in the example computing network of FIG. 1.

FIG. 5 illustrates a flowchart of another example process 500 for malicious threat detection using network event graphs based on cybersecurity events associated with computing assets 104 a/b/c of network 100. Process 500 begins at block 502 in which messaging device 402 receives cybersecurity event data from data store 118, where the event data may be included in a variety of disparate log data entries received from various computing assets within network 100 and that are stored within data store 118. Messaging device 402 pipelines the received log entries to SA device 404 to be processed and added to an example network event graph stored in one or more graph databases of module 120b. At block 504, process 500 includes SA device 404 and ETL 408 extracting certain relevant information about cybersecurity events from the log data entries. In some implementations, relevant information can include data features, such as IP addresses, Usernames, Hostnames, URL's, etc. In some instances, relevant information can be extracted in real-time or in near real-time.

At block 506, process 500 includes using the relevant extracted information to build vertices and edges that are provided for storage in data store 410, GDB 412, GDB 414, or combinations of each. At block 508, an initial network event graph can be generated, or an existing network event graph is updated, with new vertices and edges to produce a new (or updated) graph structure/model. At block 510, process 500 includes a user performing network event data analysis by submitting queries to GDB 412, GDB 414, or both. As discussed above, the submitted queries are directed at querying network event graphs stored in GDB 412 and/or GDB 414 and are used to detected malicious threats associated with network 100 based on correlations or connections between various nodes of network 100.

Figure 6:
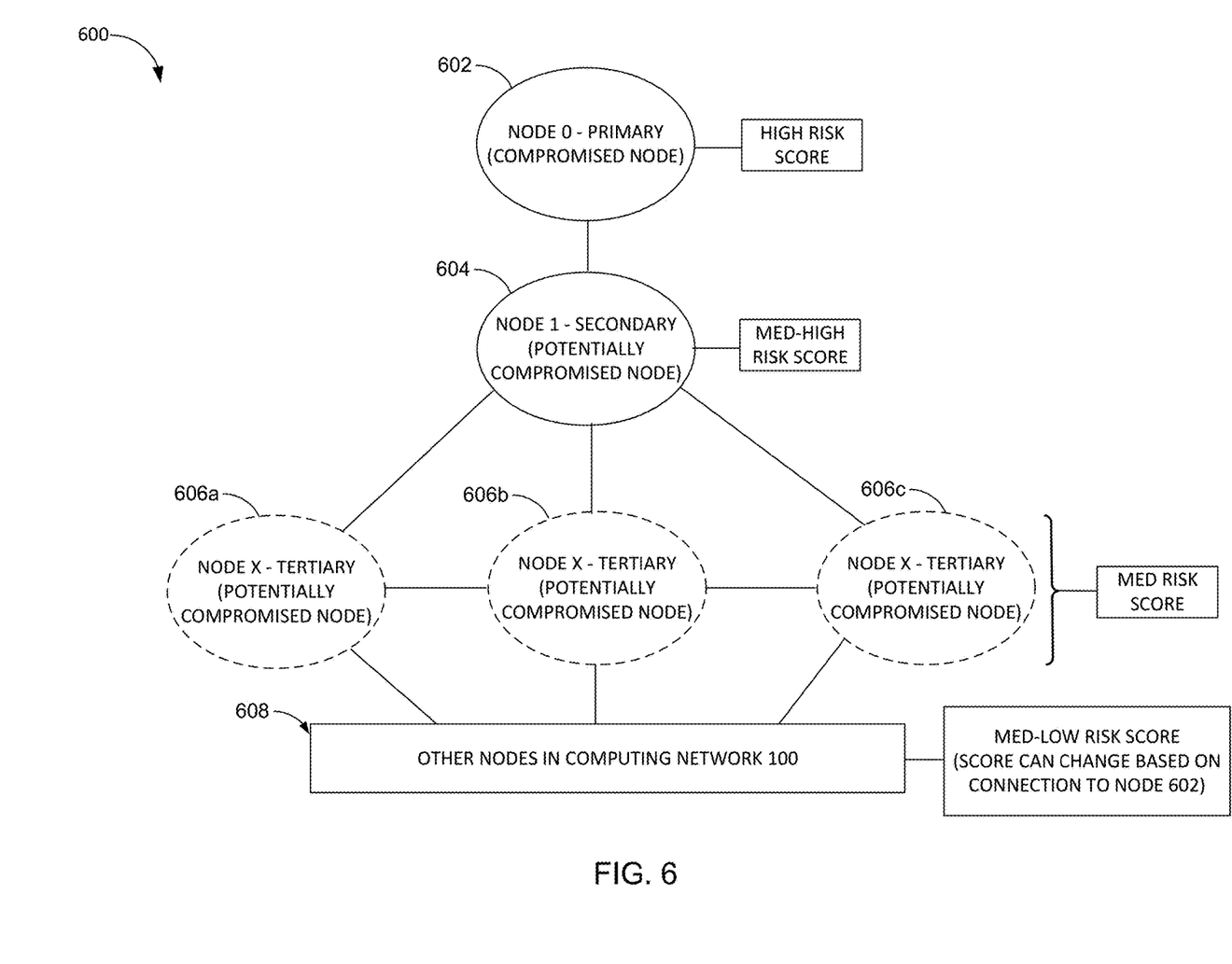
FIG. 6 illustrates an example node structure and associated risk scores that can be applied to nodes in the computing network of FIG. 1.

FIG. 6 illustrates an example node structure 600 and associated risk scores that can be applied to nodes in the computing network of FIG. 1. Structure 600 includes primary node 602, secondary node 604, tertiary nodes 606 a/b/c, and other nodes 608. In some implementations, structure 600 includes multiple secondary nodes 604, multiple tertiary nodes 606 a/b/c, and multiple other nodes 608. As shown at FIG. 6, secondary node(s) 604 can include computing assets 104 *a/b/c* or IP addresses that have a first-order/direct connection to primary node 602. Likewise, tertiary nodes 606 *a/b/c* can include computing assets 104 *a/b/c* or IP addresses that have a second-order/indirect connection to primary node 602.

As discussed above, module 120*b* is configured to receive and process queries to determine, for example, if a primary node 602 (e.g., a node infected with malicious code) has engaged in data communications (e.g., exchanged data packets) with secondary node(s) 604, and/or whether secondary node(s) 604 has engaged in data communications with one or more tertiary nodes 606*a/b/c*. Accordingly, FIG. 6 shows the degrees of separation that can exist between two or more nodes and risk scores that can be assigned based on, for example, a particular node having a direct or indirect connection to a primary node that is infected with malicious code.

As shown at FIG. 6, primary node 602 is the infected or compromised node and, thus, has the highest risk score (e.g., 0.9). Secondary node 604 has a direct connection to primary node 602 and consequently has a medium-high risk score (e.g., 0.8). Tertiary nodes 606*a/b/c* have a direct connection to secondary node 604 but an indirect connection to primary node 602, thus, nodes 606*a/b/c* will have a risk score that is slightly lower (medium risk, e.g., 0.6) than the risk score assigned to secondary node 604. Accordingly, one or more other nodes 608 in network 100 may have a lower or higher relative risk score based on their degree of separation to primary node 602. In some implementations, risk scores are assigned to certain nodes using metadata tags that are stored in GDB 412 or GDB 414.

Query results can be depicted as a node tree or node structure 600 and additional queries can be submitted to expand node structure 600 to include other nodes 608 based on detected connections to a primary node 602. In some implementations, a primary node can be a node that has recently been infected with malicious code. Hence, queries are submitted to module 120*b* to determine which other nodes may potentially be infected with malicious code or may otherwise be vulnerable or susceptible to a cybersecurity attack based on the nodes' connection or association with an infected primary node. Risk scores can be assigned based on detection of malicious network events and based on the probability that a particular malicious event has affected other computing nodes within network 100.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively, or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for detecting malicious computer network events using graph database analysis, the method comprising:
   receiving log data that includes parameters describing activity in a network;
   generating, based on the parameters, an event graph comprising information about network activity involving a primary computing node in the network;
   storing the event graph in a graph database of the network in response to generating the event graph based on the parameters;
   processing the event graph using a graphics processing unit ("GPU") that is coupled to the graph database to accelerate graphical analysis of information representing event graphs stored in the graph database;
   detecting an occurrence of a malicious event that involves the primary computing node at the network in response to processing the information about the network activity using the GPU coupled to the graph database;
   after detecting the occurrence of the malicious event that involves the primary computing node, selecting, from among all nodes in the network, a secondary computing node that has exchanged data packets directly with the primary computing node at the network in which the occurrence of the malicious event has been detected;
   selecting, from among all of the nodes of the network other than the primary computing node at the network in which the occurrence of the malicious event has been detected, a tertiary computing node that has exchanged data packets directly with the secondary computing node and that has not exchanged data packets directly with the primary computing node;
   assigning a first risk score to the secondary computing node based on the secondary computing having exchanged data packets directly with the primary computing node, and a reduced, second risk score to the tertiary computing node based on the tertiary computing node having exchanged data packets directly with the secondary computing node and the tertiary computing node having not exchanged data packets directly with the primary computing node.

2. The method of claim 1, wherein the network activity involves multiple distinct nodes in the network and processing the event graph comprises:
   determining a risk level of the network activity involving the multiple distinct nodes in response to processing the information about the network activity using the GPU coupled to the graph database.

3. The method of claim 2, wherein determining the risk level of the network activity comprises:
   generating a respective risk score for each node of the multiple distinct nodes in response to accelerating graphical analysis of the information about the network activity using the GPU coupled to the graph database; and
   determining the risk level of the network activity using the respective risk scores for each node of the multiple distinct nodes.

4. The method of claim 3, comprising:
   generating a node structure based on the respective risk scores for each node of the multiple distinct nodes; and
   based on the node structure, identifying one or more types of ordered-connections that exist between two or more nodes of the multiple distinct nodes.

5. The method of claim 4, wherein detecting the occurrence of the malicious event comprises:
detecting the occurrence of the malicious event based on:
a particular type of ordered-connection that exists between two distinct nodes of the multiple distinct nodes; and
the respective risk score for each of the two nodes.

6. The method of claim 1, comprising:
structuring the log data in a graphical format in response to determining that the parameters in the log data have a data format that conflicts with a graphical data format of the graph database; and
providing a data stream of parameters to the graph database in response to extracting the parameters from the log data as part of structuring the log data.

7. The method of claim 6, wherein storing the event graph in the graph database comprises:
storing the event graph as a graphical data structure configured for accelerated processing by the GPU coupled to the graph database, in response to structuring the log data in the graphical format.

8. The method of claim 6, wherein structuring the log data comprises:
using a stream analytics engine to apply an extraction function to a subset of the log data to extract the parameters from the subset of the log data; and
processing, by an intermediate storage device, the parameters extracted from the subset of the log data for conversion to a graphical file format that is accepted by the graph database in response to receiving the extracted parameters from the stream analytics engine.

9. The method of claim 1, wherein processing the event graph comprises:
processing, at the graph database, a plurality of event graphs stored in the graph database by using the GPU to accelerate graphical analysis of information representing each event graph of the plurality of event graphs.

10. A system for detecting malicious computer network events using graph database analysis, the system comprising:
one or more processing devices;
one or more non-transitory machine-readable storage devices storing instructions that are executable by the one or more processing devices to cause performance of operations comprising:
receiving log data that includes parameters describing activity in a network;
generating, based on the parameters, an event graph comprising information about network activity involving a primary computing node in the network;
storing the event graph in a graph database of the network in response to generating the event graph based on the parameters;
processing the event graph using a graphics processing unit ("GPU") that is coupled to the graph database to accelerate graphical analysis of information representing event graphs stored in the graph database;
detecting an occurrence of a malicious event that involves the primary computing node at the network in response to processing the information about the network activity using the GPU coupled to the graph database;
after detecting the occurrence of the malicious event that involves the primary computing node, selecting, from among all nodes in the network, a secondary computing node that has exchanged data packets directly with the primary computing node at the network in which the occurrence of the malicious event has been detected;
selecting, from among all of the nodes of the network other than the primary computing node at the network in which the occurrence of the malicious event has been detected, a tertiary computing node that has exchanged data packets directly with the secondary computing node and that has not exchanged data packets directly with the primary computing node;
assigning a first risk score to the secondary computing node based on the secondary computing having exchanged data packets directly with the primary computing node, and a reduced, second risk score to the tertiary computing node based on the tertiary computing node having exchanged data packets directly with the secondary computing node and the tertiary computing node having not exchanged data packets directly with the primary computing node.

11. The system of claim 10, wherein the network activity involves multiple distinct nodes in the network and processing the event graph comprises:
determining a risk level of the network activity involving the multiple distinct nodes in response to processing the information about the network activity using the GPU coupled to the graph database.

12. The system of claim 11, wherein determining the risk level of the network activity comprises:
generating a respective risk score for each node of the multiple distinct nodes in response to accelerating graphical analysis of the information about the network activity using the GPU coupled to the graph database; and
determining the risk level of the network activity using the respective risk scores for each node of the multiple distinct nodes.

13. The system of claim 12, the operations comprise:
generating a node structure based on the respective risk scores for each node of the multiple distinct nodes; and
based on the node structure, identifying one or more types of ordered-connections that exist between two or more nodes of the multiple distinct nodes.

14. The system of claim 13, wherein detecting the occurrence of the malicious event comprises:
detecting the occurrence of the malicious event based on:
a particular type of ordered-connection that exists between two distinct nodes of the multiple distinct nodes; and
the respective risk score for each of the two nodes.

15. The system of claim 10, the operations comprise:
structuring the log data in a graphical format in response to determining that the parameters in the log data have a data format that conflicts with a graphical data format of the graph database; and
providing a data stream of parameters to the graph database in response to extracting the parameters from the log data as part of structuring the log data.

16. The system of claim 15, wherein storing the event graph in the graph database comprises:
storing the event graph as a graphical data structure configured for accelerated processing by the GPU coupled to the graph database, in response to structuring the log data in the graphical format.

17. The system of claim 15, wherein structuring the log data comprises:
using a stream analytics engine to apply an extraction function to a subset of the log data to extract the parameters from the subset; and processing, by an intermediate storage device, the parameters extracted from the subset for conversion to a graphical file format that is accepted by the graph database in response to receiving the extracted parameters from the stream analytics engine.

18. The system of claim 10, wherein processing the event graph comprises:
processing, at the graph database, a plurality of event graphs stored in the graph database by using the GPU to accelerate graphical analysis of information representing each event graph of the plurality of event graphs.

19. A non-transitory machine-readable storage device storing instructions that are executable by a processing device to cause performance of operations comprising:
receiving log data that includes parameters describing activity in a network;
generating, based on the parameters, an event graph comprising information about network activity involving a primary computing node in the network;
storing the event graph in a graph database of the network in response to generating the event graph based on the parameters;
processing the event graph using a graphics processing unit ("GPU") that is coupled to the graph database to accelerate graphical analysis of information representing event graphs stored in the graph database;
detecting an occurrence of a malicious event that involves the primary computing node at the network in response to processing the information about the network activity using the GPU coupled to the graph database;
after detecting the occurrence of the malicious event that involves the primary computing node, selecting, from among all nodes in the network, a secondary computing node that has exchanged data packets directly with the primary computing node at the network in which the occurrence of the malicious event has been detected;
selecting, from among all of the nodes of the network other than the primary computing node at the network in which the occurrence of the malicious event has been detected, a tertiary computing node that has exchanged data packets directly with the secondary computing node and that has not exchanged data packets directly with the primary computing node;
assigning a first risk score to the secondary computing node based on the secondary computing having exchanged data packets directly with the primary computing node, and a reduced, second risk score to the tertiary computing node based on the tertiary computing node having exchanged data packets directly with the secondary computing node and the tertiary computing node having not exchanged data packets directly with the primary computing node.

20. The machine-readable storage device of claim 19, wherein the network activity involves multiple distinct nodes in the network and processing the event graph comprises:
determining a risk level of the network activity involving the multiple distinct nodes in response to processing the information about the network activity using the GPU coupled to the graph database.

* * * * *